United States Patent [19]

Vetter et al.

[11] Patent Number: 5,053,177
[45] Date of Patent: * Oct. 1, 1991

[54] METHOD FOR MAKING A COATED SYNTHETIC RESIN WEB

[75] Inventors: Heinz Vetter, Rossdorf; Werner Siol, Darmstadt-Eberstadt, both of Fed. Rep. of Germany

[73] Assignee: Röhm GmbH, Darmstadt, Fed. Rep. of Germany

[*] Notice: The portion of the term of this patent subsequent to May 1, 2007 has been disclaimed.

[21] Appl. No.: 352,051

[22] Filed: May 15, 1989

[30] Foreign Application Priority Data

May 18, 1988 [DE] Fed. Rep. of Germany ....... 3816855

[51] Int. Cl.$^5$ .............................................. B29C 47/88
[52] U.S. Cl. ...................................... 264/134; 264/22; 264/171; 264/236; 264/280; 264/347; 264/348; 264/83; 264/204; 425/371
[58] Field of Search ................ 264/22, 129, 131, 134, 264/171, 280, 177.1, 216, 177.18, 236, 255, 347, 340, 1-6, 204, 83; 425/90, 91, 106, 101, 371, 363; 427/32, 359, 365, 372.2

[56] References Cited

U.S. PATENT DOCUMENTS

| | | | |
|---|---|---|---|
| 2,615,822 | 10/1952 | Huebner | 427/32 |
| 3,097,106 | 7/1963 | Blout et al. | 117/64 |
| 3,852,387 | 12/1974 | Bortnick et al. | 264/40 |
| 3,968,309 | 7/1976 | Matsuo et al. | 428/409 |
| 3,978,178 | 8/1976 | Oshima et al. | 264/25 |
| 4,076,788 | 2/1978 | Ditto | 264/255 |
| 4,082,486 | 4/1978 | Cerano et al. | 425/129 R |
| 4,647,417 | 3/1987 | Bottger et al. | 425/371 |
| 4,719,146 | 1/1988 | Hohage et al. | 428/331 |
| 4,743,187 | 5/1988 | Schermutzki | 425/371 |
| 4,758,448 | 7/1988 | Sandvig et al. | 427/54.1 |
| 4,777,094 | 10/1988 | Mauri et al. | 428/463 |
| 4,814,207 | 3/1989 | Siol et al. | 427/393.5 |
| 4,874,657 | 10/1989 | Lo et al. | 425/363 |
| 4,921,669 | 5/1990 | Vetter et al. | 264/134 |

FOREIGN PATENT DOCUMENTS

| | | |
|---|---|---|
| 0102847 | 3/1984 | European Pat. Off. . |
| 20123374 | 10/1984 | European Pat. Off. . |
| 30191979 | 8/1986 | European Pat. Off. . |
| 10199122 | 10/1986 | European Pat. Off. . |
| 20272933 | 6/1988 | European Pat. Off. . |
| 30285669 | 10/1988 | European Pat. Off. . |
| 12058504 | 6/1972 | Fed. Rep. of Germany . |
| 22164716 | 7/1972 | Fed. Rep. of Germany . |
| 12455715 | 5/1975 | Fed. Rep. of Germany . |
| 12422378 | 11/1975 | Fed. Rep. of Germany . |
| 22448477 | 4/1976 | Fed. Rep. of Germany . |
| 12803144 | 7/1979 | Fed. Rep. of Germany . |
| 22911648 | 9/1980 | Fed. Rep. of Germany . |
| 23028562 | 3/1981 | Fed. Rep. of Germany . |
| 23203540 | 8/1982 | Fed. Rep. of Germany . |
| 13140316 | 4/1983 | Fed. Rep. of Germany . |
| 23241264 | 5/1984 | Fed. Rep. of Germany . |
| 23531031 | 3/1987 | Fed. Rep. of Germany . |
| 13616176 | 11/1987 | Fed. Rep. of Germany . |
| 13642138 | 6/1988 | Fed. Rep. of Germany . |
| 59-62610 | 4/1984 | Japan ................................. 264/280 |
| 62-184834 | 8/1987 | Japan ................................. 264/280 |
| 302452 | 1/1955 | Switzerland ..................... 264/280 |
| 20607693 | 9/1948 | United Kingdom . |
| 0889486 | 2/1962 | United Kingdom . |
| 11370480 | 10/1974 | United Kingdom . |
| 11420064 | 1/1976 | United Kingdom . |

OTHER PUBLICATIONS

Chemical Abstracts, vol. 99, 39876j (1983).
Chemical Abstracts, vol. 97, 164254q (1982).
Chemical Abstracts, vol. 77, 116217v (1972).

Primary Examiner—Jeffery Thurlow
Assistant Examiner—Mathieu Vargot
Attorney, Agent, or Firm—Curtis, Morris & Safford

[57] ABSTRACT

An extruded web of synthetic resin having a scratch resistant coating thereon is made by depositing a material adapted to form a scratch resistant coating onto the return run of at least one of the endless belts of a dual belt continuous casting machine, the coating being transferred to the surface of the web as the extruded web is polished and cooled in the casting machine.

15 Claims, 1 Drawing Sheet

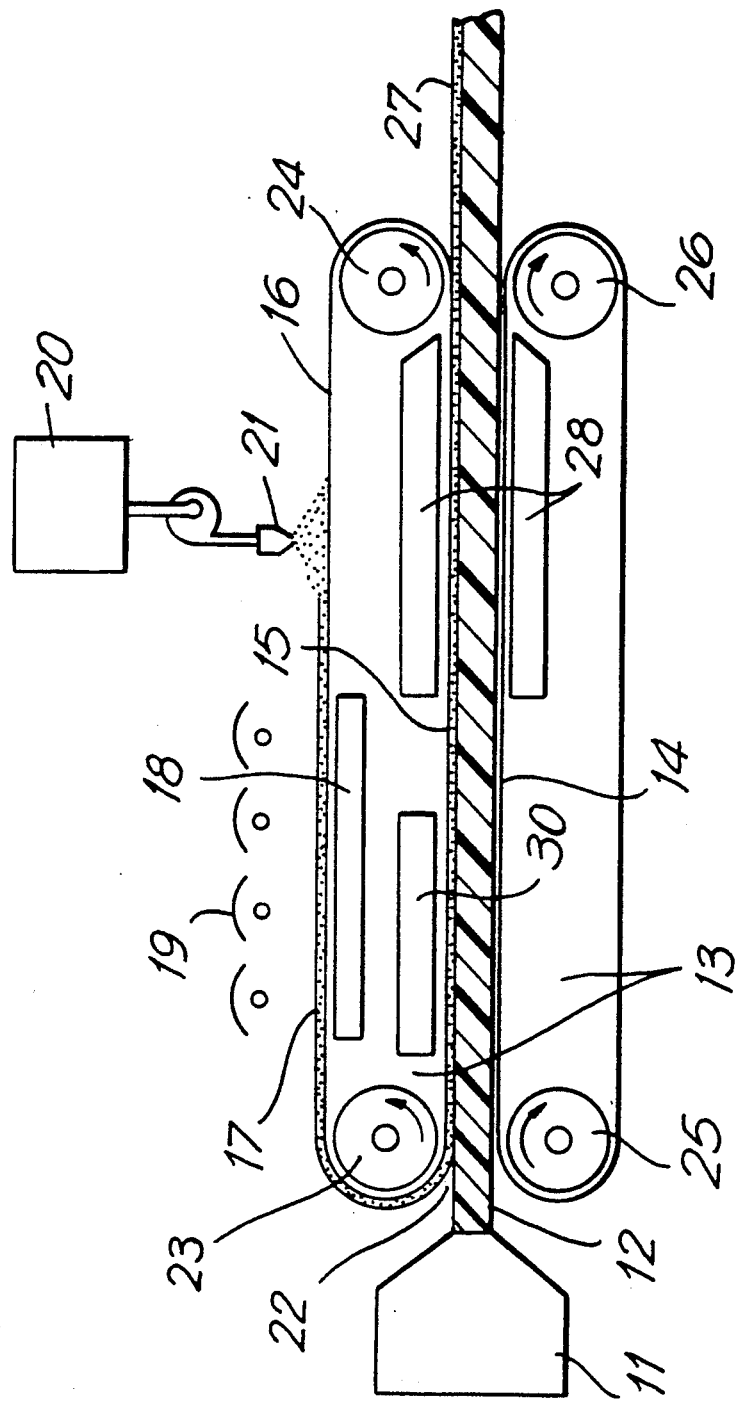

METHOD FOR MAKING A COATED SYNTHETIC RESIN WEB

The present invention relates to a method for making a synthetic resin web having a scratch resistant coating thereon by shaping a thermoplastic molding composition into a weblike strand with a dual belt continuous casting machine, the web being coated with a material, present on one or both belts of said machine, adapted to form a scratch resistant surface.

THE PRIOR ART

The production in one operation of extruded synthetic resin webs having a scratch resistant coating is not known.

It is known, however, to provide injection molded synthetic resin articles with a scratch resistant coating by dipping them, in a subsequent operation, in a solution of a material adapted to form a scratch resistant coating, evaporating the solvent, and curing the coating. In a second process described in German patent publication 24 55 715, a solution is used for this purpose which contains a free radically polymerizable compound having at least three acrylic or methacrylic groups and a free radical-forming initiator. However, the subsequent application of a coating has an adverse effect on the dimensional accuracy of the molded article. Also, the solvent contained in the coating solution may give rise to cracks in the synthetic resin article.

As described in German patent 20 58 504, a piece of plate glass is coated with a liquid mixture that is curable to form a scratch resistant coating resin. A plate of a synthetic resin is then laid on it with exclusion of air bubbles, the free surface of the resin plate is coated with the liquid mixture, a second piece of plate glass is placed on it, the layers of the mixture are cured, and the pieces of plate glass are removed. However, this method does not lend itself to the continuous production of synthetic resin webs with a scratch resistant coating.

For the manufacture of coated injection molded parts, European patent 123,374 proposes that after an injection molded part has been produced the mold be slightly opened, a liquid composition be injected to form a surface coating, and the mold be again closed. During the rotary motion which the two halves of the mold undergo as it is being closed, the composition is distributed over the surface of the molded part and then cures.

In a number of other known methods, which in plastics technology are known as in-mold coating methods, molded parts having a scratch resistant surface coating are produced by providing the shaping surface of an injection mold with a scratch resistant coating and injecting into the mold so prepared a curable mass for formation of the inner molded part and curing it. For example, in the first process described in German patent publication 24 55 715, a layer of a coating material is applied to the inner wall of the mold and photochemically cured under an oxygen free atmosphere. A monomer adapted to form the molded part, for example, a methacrylate syrup, is then injected into the mold and polymerized under predetermined conditions. In the process, the layer applied to the wall of the mold bonds to the polymeric part being formed and after polymerization can be removed from the mold with it.

In a closely similar method described in German patent publication 21 64 716, the coating applied to the inner wall of the mold is covered with a sheet and cured by means of free radical initiators, which makes it possible to dispense with the use of an oxygen free protective gas. After the coating has cured, the sheet is removed and a monomer that is to form the synthetic resin core is introduced and polymerized. A similar procedure is used in the methods of German patents 31 40 316 and 30 28 562, where the walls of the mold are coated with a colored material and an unsaturated polyester resin is then injected into the mold cavity and cured.

According to German patent 32 03 540, injection molded parts with a scratch resistant surface are produced by inserting a length of sheeting bearing a scratch resistant coating in the injection mold and then injecting a thermoplastic molding compound, which bonds to the sheeting under the pressure of the molding compound.

For the production of injection molded parts with a colored surface coating, German patent publication 28 03 144 proposes that a film of a coating composition be deposited on the inside of an injection mold and then cured. The mold is then closed and a molding compound is injected.

According to German patent 24 48 477, the inside of a heated mold is electrostatically coated with a powdered thermoplastic resin, which then agglomerates by sintering to form a coating. A molding compound which contains a blowing agent is then injected. A molded foamed plastic article is so obtained which has a surface coating of the thermoplastic material, which possesses higher scratch resistance than the foamed plastic article.

All of the aforesaid methods lend themselves only to the production of individual molded articles by injection molding or to the production of individual synthetic resin sheets, not to the production of continuous synthetic resin webs.

For the production of flat webs of a thermoplastic resin with low orientation, it is known from U.S. Pat. No. 3,852,387 to extrude the resin through a slot die in the thermoplastic state into a weblike strand and to introduce the latter into a dual belt casting machine, where it is smoothed to a uniform flat web and cooled to a temperature below the softening point. The dual belt casting machine comprises two endless belts running parallel to each other and in the same direction, and spaced a constant distance apart, around at least two end rolls, as well as cooling means acting on the underside of the moving endless belts.

THE OBJECT AND THE INVENTION

The object of the invention is to provide continuous synthetic resin webs having a scratch resistant surface.

In accordance with the invention, this object is accomplished by using, in a process for the production of molded synthetic resin articles bearing a scratch resistant coating by coating the shaping surface of a mold with a material adapted to form the scratch-resistant coating, molding a thermoplastic molding composition by means of the coated mold, and cooling it to a temperature below its softening point, as a mold a dual belt continuous casting machine comprising two endless belts running parallel to each other and in the same direction, and spaced a constant distance apart, around at least two end rolls, molding the molding composition into a continuous synthetic resin web, and cooling it to a temperature below the softening point of the thermoplastic resin, the material adapted to form the scratch resistant coating being deposited on the surface of the return run of at least one of the endless belts of the dual belt continuous casting machine. In the inlet nip of the dual belt casting machine, the coating deposited on the belt, which may have undergone a partial cure, comes into contact with the thermoplastic resin strand and bonds to it so that it leaves the casting machine with the cooled resin web as a scratch resistant coating.

The continuous synthetic resin web is produced in known manner by melting a suitable synthetic resin within an extruder and extruding the melt through a slot die. The continuous web is solidified, after forming and coating, by cooling to a temperature below the softening point of the synthetic resin.

The accompanying drawing shows a vertical section through a machine for the production of a synthetic resin web provided on one side with a scratch resistant coating by the process of the invention.

In a preferred embodiment of the invention, a liquid mixture of at least one free radically polymerizable monomer having more than one polymerizable double bond and of at least one free radical-forming initiator which at temperatures between the temperature of the surface of the endless belt and the temperature of the thermoplastic molding composition, or under the action of ultraviolet radiation, forms free radicals is deposited on the mold-forming surface of at least one endless belt. Polymerization of the monomers sets in either immediately or after contact with the molding composition and is completed before the synthetic resin web has been cooled to a temperature below its softening point. Polymerization may be regarded as completed when a hard, scratch resistant coating has been obtained, even if unreacted double bonds are still detectable therein.

BRIEF DESCRIPTION OF THE DRAWING

The accompanying drawing is a side view, in section, through a dual belt continuous casting machine for the production of a synthetic resin web to be provided on one side with a scratch resistant coating by the method of the invention.

More in particular, FIG. 1 shows slot die 11 through which is extruded flat synthetic resin web 12 which is polished and cooled in continuous casting machine 13 between spaced parallel endless belts 14 and 15 running in the direction of extrusion between rolls 23 and 24 and 25 and 26, respectively. Web 12 may suitably be from 0.05 mm to 20 mm thick and from 20 cm to 300 cm wide, for example. Upper belt portion 16 returns in the opposite direction between rolls 24 and 23. An arrangement comprising container 20 and spray apparatus 21 dispenses curable coating material onto this upper belt portion 16, which may be heated by hot plate 18 or heating elements 19, whereby partially polymerized layer 17 of coating material is formed. This layer comes in contact with web 12 at entry slit 22. Both web and layer may be cooled by cooling elements 28 and 30, and web 12 exits from the machine with cured scratch resistant coating 27 thereon.

ADVANTAGES OF THE INVENTION

The process of the invention lends itself to the continuous production of synthetic resin webs having a scratch resistant surface. Conventional extrudable molding compositions without reactive groups can be used to produce the webs. Between the time that the material which is to form the scratch resistant coating is deposited on the endless belt and the time that the endless belt so coated makes contact with the thermoplastic strand, an interval elapses which can be varied within fairly wide limits and during which the coating can be pretreated, that is, cured partially or completely, under conditions which can be largely chosen at will. After the strand has been introduced into the dual belt continuous casting machine, an interval which again is variable is available for heat curing the coating. The process can thus be ideally adapted to the optimum processing conditions of the scratch resistant coating. A scratch resistant coating of excellent surface quality can be produced simultaneously on both sides of the web.

USE OF THE INVENTION

The process of the invention is suitable for the production of continuously extruded synthetic resin webs having a scratch resistant surface on one side or on both sides. The width of the web is limited only by the width of the slot die available for extrusion and by the width of the dual belt continuous casting machine. The invention is of primary importance, of course, for the production of webs with a high gloss surface, and particularly of webs of crystal clear resin compositions.

Illustrative of suitable extrudable synthetic resin compositions are polyethylene, polypropylene, polystyrene, polyvinyl chloride, and thermoplastic polyesters. Preferred are polycarbonates such as bisphenol A polycarbonate, and particularly acrylic glass, meaning homo- and copolymers of methyl methacrylate containing more than 80 percent of MMA. The extruded synthetic resin should comprise less than 0.5 percent by weight of volatile components; i.e. materials having a boiling point (at atmospheric pressure) below the extrusion temperature of the synthetic resin. Residual monomers are an example of such volatile materials.

PRACTICE OF THE INVENTION

Any material which can be distributed as a melt, a solution, or a curable liquid resin over the surface of returning portion 16 of an endless belt to form a coherent layer; which bonds on contact to thermoplastic molding composition 12; and which cures to form a surface coating having adequate scratch resistance when cooled to a temperature below the softening point of the molding composition, can be used for coating the belt. Those coatings 27 which are harder than the molding composition from which synthetic resin web 12 is formed are "scratch resistant" which in the meaning of the invention. The hardness of the coating can be adapted to particular requirements by selection appropriate known coating formulations. When UV initiators are used, a material that is sufficiently transparent to UV radiation should be used.

In every case, the material adapted to form a scratch resistant coating should contain an organic polymer, or precondensates or components for the formation of such a polymer. If desired, adhesion may be enhanced by the reaction of reactive groups in the coating with co-reactive groups in the molding composition; however, such groups are not a requirement of the process of the invention. The material adapted to form the scratch resistant coating may attain its hardness solely through the drying of a solution of the material or through the solidification of a melt.

During the time elapsing between the deposition of the coating on the belt surface and the cooling of the polished web to a temperature below the softening point of the thermoplastic molding composition, a curing reaction preferably takes place with the formation of crosslinkages within the coating. Crosslinking may occur, for example, by the reaction of hydroxyl or amino groups of the polymer or precondensate with co-reactive groups of a polyfunctional crosslinking agent such as amide methylol groups, isocyanate groups or oxirane groups. A great many resin systems of this type are known. Examples are phenol-formaldehyde resins, urea-formaldehyde resins, melamine resins, epoxy resins, and polyurethane resins.

The material adapted to form a scratch resistant coating which is deposited on the belt surface is preferably a liquid mixture of at least one free radically polymerizable monomer having more than one polymerizable double bond and of at least one free radical-forming initiator which at temperatures between the temperature of the belt surface and the temperature of the thermoplastic molding composition, or under the action of ultraviolet radiation, forms-free radicals.

The monomers used to form the scratch resistant coating will have at least two and rarely more than six polymerizable double bonds. These may be present in acryloyl, methacryloyl, vinyl, allyl or methallyl groups. Preferred are esters of acrylic or methacrylic acid with polyhydric aliphatic alcohols. These usually contain from 2 to 10 carbon atoms and from 2 to 6 hydroxyl groups, which may be esterified in whole or in part. Examples of such monomers are ethylene glycol diacrylate and dimethacrylate, 1,2-propylene glycol diacrylate and dimethacrylate, 1,2- or 1,4-butylene glycol diacrylate and dimethacrylate, glycerol triacrylate and trimethacrylate, pentaerythritol tri- and tetraacrylate and -methacrylate, trimethylolpropane triacrylate and trimethacrylate, as well as the acrylic esters of dipentaerythritol. Of the aforesaid esters, those of acrylic acid polymerize more rapidly and more completely than those of methacrylic acid, for which reason the acrylic esters are best used alone, unless mixtures of acrylic and methacrylic esters are used in which the former clearly predominate and the latter amount to not more than 30, and preferably not more than 15, percent by weight. Monomers with boiling points above 140° C. are preferred.

Of the polyfunctional monomers, those having three or more carbon-to-carbon double bonds will result in particularly high crosslinking density, and hence in particularly high scratch resistance. However, because of their usually high viscosity they are difficult to process in pure form at room temperature. The viscosity can be reduced through a proportion of difunctional monomers. This can be achieved also by the addition of monofunctional monomers. While these will not contribute to crosslinking, they will impart greater flexibility to the scratch resistant coating. Illustrative of monofunctional monomers are styrene, acrylonitrile, methacrylonitrile, monoalkyl esters of acrylic or methacrylic acid having from 1 to 10 carbon atoms in the alkyl group or having substituted alkyl groups carrying alkoxy or hydroxyl groups, for example, as substituents.

To obtain a good processing viscosity and high flexibility of the scratch resistant coating, the percentage of mono- and difunctional monomers may be increased to as much as 70 percent by weight of the monomer mixture, while for the sake of high scratch resistance the percentage of tri- or polyfunctional monomers should not be less than 30 percent by weight. Surprisingly, the monomer mixture may contain up to 30 percent by weight of acrylic or methacrylic acid without the scratch resistance being adversely affected. The viscosity of the liquid monomer mixture, measured at 20° C., advantageously is not over 100 mPa's.

In addition to or in place of the mono- or difunctional monomers, nonpolymerizable liquid volatile organic solvents may be used to achieve good processing viscosity. They should have largely or completely evaporated from the coating deposited on the belt surface before it comes into contact with the thermoplastic molding composition. The unevaporated residue will gradually volatilize after the web has exited the dual belt continuous casting machine.

To be able to evaporate, the solvent should have a boiling point below that of the monomers used. Examples of suitable organic solvents are aliphatic esters, ethers, ketones, chlorinated hydrocarbons and aromatic hydrocarbons. Among the ketones, which are generally preferred, cyclohexanone deserves special mention. The coated belt is advantageously held at a temperature above the boiling point of the solvent over a sufficiently, long distance before the point where the thermoplastic strand enters the dual belt casting machine.

The function of the free radical-forming initiator is to cure by polymerization the coating of the monomer mixture deposited on the belt surface. Curing may be completed before the coated belt surface makes contact with the web of thermoplastic molding composition. In that case, the cured coating cannot be dislodged from the molding composition. However, the adhesion between the coating and the cooled molding composition is not always fully satisfactory. Better adhesion is achieved when the polymerization of the coating is completed only in contact with the molding composition. When polymerization has not sufficiently progressed by the time the coating comes into contact with the molding composition, the coating may be partly displaced from the belt surface. The point where the material which is to form the scratch resistant coating is deposited on the return run of the endless belt should be chosen in coordination with the speed of the endless belts in such a way that the time interval between the deposition of the monomer mixture on the belt surface and its coming into contact with the thermoplastic molding composition is sufficient for partial polymerization to such a degree that displacement of the coating is prevented, yet adequate adhesion is obtained.

When atmospheric oxygen is admitted to the polymerizing coating on the belt surface, polymerization is inhibited more markedly at the exposed surface of the coating than over the area where it is in contact with the belt surface. The latter side of the coating thus is cured more or less completely while the other side remains in a partially polymerized state until the admission of air is barred as the coating comes into contact with the molding composition, with polymerization then going to completion and resulting in good adhesion. If despite this desirable inhibitory effect of atmospheric oxygen complete curing of the coating is desired before it makes contact with the molding composition, it will be advisable to blow an inert gas onto the coated belt surface.

Particularly well suited for the process of the invention are free radical-forming initiators with a half-life of less than two minutes at 100° C. (See Ullmanns Enzyklopadie der technischen Chemie, 3rd ed., 1970, Supplement, pp. 177–181.) Especially well suited are aliphatic peroxydicarbonates, including:
Diethyl peroxydicarbonate
Dichloroethyl peroxydicarbonate Diisopropyl peroxydicarbonate
Diisobutyl peroxydicarbonate
Di-2-ethylhexyl peroxydicarbonate
Dicyclohexyl peroxydicarbonate
Di(alkylcyclohexyl) peroxydicarbonate
Di(methylcyclohexyl) peroxydicarbonate
Di(tert-butylcyclohexyl) peroxydicarbonate
In this connection, see Swern, Organic Peroxides, John Wiley & Sons, vol. 1, 1970, pp. 68–73, and vol. 2, 1971, pp. 863–867. Suitable UV initiators are benzophenone, benzoin ether, halogenated ketones such as trichloroacetophenone, benzildialkyl ketals, thioxanthone derivatives, hydroxyalkyl phenones and diethoxy acetophenone, for example.

The initiators, such as the aforesaid peroxydicarbonates, are used in amounts of from 0.1 to 10, and more particularly from 1 to 7, percent by weight, based on the total weight of the monomer mixture. Aside from initiators with a half-life of less than two minutes, initiators having a half-life of more than two minutes at 100° C. may be used in a lesser amount, for example, up to onefifth of that of the first mentioned initiators. Examples are dilauroyl peroxide, tert-butyl peroxypivalate, and dibenzoyl peroxide.

If desired, further additives may be admixed with the liquid monomer mixture, for example, flow control agents, antioxidants, antistatic agents, or UV stabilizers. Commonly used nonpolymerizable UV absorbers as listed in Ullmanns Enzyklopadie der technischen Chemie, 4th ed., vol. 15, pp. 253–260, may be used. However, polymerizable UV absorbers, such as 3-(2-benzotriazolyl)2-hydroxy-5-tert-octylbenzyl methacrylamide, are more advantageous.

The material adapted to form the scratch resistant coating, for example the monomer mixture consisting of monomers and initiators and optionally of organic solvents and further additives, is deposited on the surface of the return run of the endless belt in a thickness of from 1 to 100 microns, and preferably from 2 to 50 microns. Lesser coating thicknesses could not be relied on to provide scratch resistance, and greater coating thicknesses would not improve the scratch resistance further but would merely reduce the elasticity and adhesive strength of the coating. The endless belt may be roller-, knife-, cast- or, preferably, spray-coated. The temperature of the coating material should be maintained so far as possible from the supply tank to the applicator within a range in which no appreciable curing sets in.

Depending on whether the synthetic resin web is to be provided with a scratch resistant coating only on one side or on both sides, the coating is deposited on just one of the endless belts or on both.

For the partial or complete cure of the coating, the coated portion of the return run of the endless belt is usually held at a temperature between 20 and 180° C. This may be accomplished by means of a heating plate 8 acting on the underside of the belt or of heat lamps 9 directed onto the belt surface.

Polymerization may be completed within 5 to 600 seconds, particularly when atmospheric oxygen is excluded. The preferred time interval between the deposition of the coating and the introduction of the strand of molding composition ranges from 10 to 200 seconds. As soon as the coating has been cured to the desired degree, it can be brought into contact with the synthetic resin web in the molten or thermoelastic state. The final cure takes place during the time elapsing until it has cooled to a temperature below its softening point.

The quality of the scratch resistant coating on the finished molded article will depend on the composition of the monomer mixture used, and particularly on the crosslinking density, the elasticity, and the adhesion to the subjacent molding composition. When the composition is selected judiciously, a scratch resistance equal or superior to that achieved with high quality scratch resistant coatings on a polysiloxane basis will be attained. The best coatings producible in accordance with the invention cannot be scratched by grade 00 steel wool even with hard rubbing.

EXAMPLES

In the examples which follow, the following starting materials were used:
 (A) Pentaerythritol tetraacrylate
 (B) 1,6-Hexanediol diacrylate
 (C) bis-4-tert-Butylcyclohexyl peroxydicarbonate
 (D) Trimethylolpropane trisacrylate
 (E) Cyclohexanone

EXAMPLE 1

9.43 g of a mixture of 56 wt. % of (A) and 44 wt. % of (B) were mixed in a beaker with 1.6 g of an initiator solution. The latter consisted of 10.5 g of methyl ethyl ketone in which 1.6 g of (C) had been dissolved as an initiator. This solution was introduced into the cup of a spray head and sprayed continuously by means of nitrogen as a carrier gas at a spraying pressure of 4 to 5 bar onto the surface of the return run of the upper endless belt 100 cm before the first end roll of a dual belt continuous casting machine. The belt had a surface temperature of 70° C. at the point of application of the coating and a speed of 1.5 cm/sec, so that 130 seconds elapsed before the coating entered the nip between the two belts. No additional heat was supplied to the belt in the region between the point of application and the end roll. The temperature of the end roll 13 was 200° C.

In the inlet nip of the dual belt continuous casting machine, the coated belt surface made contact with a web 3 mm thick of a PMMA molding composition (Plexiglas Y8N, crystal clear) which had a surface temperature of 230° C. The steel belt, and with it the synthetic resin web, was then cooled by means of two contact cooling surfaces and each 60 cm long, in such a way that the temperature of the web leaving the casting machine was 80° C. The temperature of the two contact cooling surfaces was 40° C.

EXAMPLE 2

5.54 g of a monomer mixture consisting of 21 wt. % of (A) and 79 wt. % of (D) were mixed with 2 wt. % of an initiator solution. The latter contained 6.6 g of (E) in which 16 wt. % of (C) had been dissolved.

The further processing was the same as in Example 1.

EXAMPLE 3

8 g of a monomer mixture consisting of 56 wt. % of (A) and 44 wt. % of (B) were mixed with 16 wt. % of an initiator solution. The latter consisted of 23.4 g of (E) with 9 wt. % of initiator (B). This spray solution was applied as in Example 1. The surface temperature of the belt was 100° C.

In the inlet nip, the coating was contacted with a web 2 mm thick of a polycarbonate molding composition (Makrolon 2800). The synthetic resin web so obtained had a scratch resistant coating 10 microns thick.

What is claimed is:

1. A method for providing a scratch resistant film on a continuous synthetic resin web, which method comprises
   (a) shaping a thermoplastic synthetic resin molding composition into said continuous web in a dual belt continuous casting machine between two parallel endless belts running in the same direction and spaced a constant distance apart to form said continuous synthetic resin web;
   (b) depositing a material adapted to forming said scratch resistant film onto a shaping surface of the return run of at least one of said endless belts, said material being a liquid mixture of (1) at least one monomer susceptible of free radical polymerization and having more than one polymerizable double bond and of (2) an initiator which forms free radicals under ultraviolet radiation or at a temperature at or above the temperature of said shaping surface of said return run and at or below the temperature of said thermoplastic synthetic resin molding co position;
   (c) contacting said continuous web of thermoplastic synthetic resin molding composition and said film of material formed on said belt when the monomer or monomers in the film on said belt has been partially copolymerized;
   (d) keeping said film of material formed on said belt in contact with said continuous web as said web cools;
   (e) curing said film, in contact with said web and said belt until said web has cooled to a temperature below the softening point of said thermoplastic synthetic resin molding composition; and
   (f) removing said cooled web, having said cured film thereon, from the surface of said belt.

2. A method as in claim 1 wherein said liquid mixture for formation of said scratch resistant film is deposited on the surface of the endless belt when the latter has a temperature between 20° C. and 150° C.

3. A method as in claims 1 wherein said liquid mixture deposited for formation of said scratch resistant film contains a volatile organic solvent.

4. A method as in claim 3 wherein said solvent has a boiling point below the boiling point of the monomer or monomers in said liquid mixture.

5. A method as in claims 4 wherein said solvent contains no free radically polymerizable carbon-to-carbon double bonds.

6. A method as in claim 3 wherein said liquid mixture containing a solvent is deposited on the surface of said endless belt and said surface is then brought into contact with said thermoplastic molding composition after the solvent has been largely evaporated.

7. A method as in claim 1 wherein the monomer or monomers having more than one polymerizable double bond in said liquid mixture has more than one acryloyl group.

8. A method as in claim 7 wherein said monomer or monomers have at least 70 mole percent of its polymerizable double bonds present in acryloyl groups.

9. A method as in claim 7 wherein at least one monomer contains at least three acryloyl groups.

10. A method as in claim 1 wherein said polymerizable monomers has a boiling point about 140° C.

11. A method as in claim 1 wherein said free radical-forming initiator has a half-life of less than two minutes at 100° C.

12. A method as in claim 11 wherein said initiator is an aliphatic, peroxydicarbonate.

13. A method as in claim 1 wherein said thermoplastic molding composition is brought into contact with said material adapted to forming a scratch resistant film at a temperature between 200° C. and 350° C.

14. A method as in claim 1 wherein the partially polymerized monomer or monomers in said coating is exposed to the action of atmospheric oxygen during its partial polymerization.

15. A method as in claim 1 wherein said thermoplastic molding composition is contacted with the shaping surface of said endless belt from 10 to 200 seconds after said liquid mixture containing a polymerizable monomer or monomers has been deposited on said shaping surface.

* * * * *